(12) United States Patent
Schaefer et al.

(10) Patent No.: US 12,117,213 B1
(45) Date of Patent: Oct. 15, 2024

(54) PORTABLE INTERNAL COMBUSTION ENGINE WITH HEATING AND COOLING CAPABILITIES

(71) Applicants: Justin Schaefer, Cedar Hill, TX (US); Michael Baldwin, Grand Prairie, TX (US)

(72) Inventors: Justin Schaefer, Cedar Hill, TX (US); Michael Baldwin, Grand Prairie, TX (US)

( * ) Notice: Subject to any disclaimer, the term of this patent is extended or adjusted under 35 U.S.C. 154(b) by 57 days.

(21) Appl. No.: 17/556,554

(22) Filed: Dec. 20, 2021

Related U.S. Application Data

(63) Continuation-in-part of application No. 16/688,085, filed on Nov. 19, 2019, now Pat. No. 11,187,442.

(60) Provisional application No. 62/769,293, filed on Nov. 19, 2018.

(51) Int. Cl.
| | |
|---|---|
| *F25B 29/00* | (2006.01) |
| *B01D 46/42* | (2006.01) |
| *F02B 63/06* | (2006.01) |
| *F25B 1/00* | (2006.01) |

(52) U.S. Cl.
CPC ........ *F25B 29/003* (2013.01); *B01D 46/4263* (2013.01); *F02B 63/06* (2013.01); *F25B 1/00* (2013.01); *B01D 2279/60* (2013.01); *F25B 2327/001* (2013.01); *F25B 2339/04* (2013.01)

(58) Field of Classification Search
CPC ...... F25B 29/003; F25B 1/00; F25B 2339/04; B01D 46/4263; B01D 2279/60; F02B 63/06
See application file for complete search history.

(56) References Cited

U.S. PATENT DOCUMENTS

| | | | | |
|---|---|---|---|---|
| 5,031,690 | A * | 7/1991 | Anderson | F25B 6/02 |
| | | | | 62/239 |
| 5,228,309 | A * | 7/1993 | McCullough | F01C 21/06 |
| | | | | 123/204 |
| 8,424,303 | B2 | 4/2013 | Kardos | |
| 8,490,585 | B2 | 7/2013 | Kienzle | |
| 2009/0241916 | A1 | 10/2009 | Herzer | |
| 2020/0011550 | A1* | 1/2020 | Williams | F24F 1/022 |
| 2022/0243672 | A1* | 8/2022 | Wischstadt | F02B 77/086 |

FOREIGN PATENT DOCUMENTS

EP    1995432 A1    11/2008

* cited by examiner

*Primary Examiner* — Elizabeth J Martin
(74) *Attorney, Agent, or Firm* — Richard G Eldredge; Leavitt Eldredge Law Firm

(57) ABSTRACT

A portable internal combustion engine system includes an internal combustion engine having a first output shaft, the internal combustion engine rotates the first output shaft; a compressor rotably engaged with the first output shaft via a belt, the first output shaft is configured to provide energy thereto; a fan coupled to the internal combustion engine to pull air into a housing; an evaporative coil in communication with the housing and to receive air from the fan; a condenser coil in communication with the housing and to receive air from the fan; and a control system to operate the compressor, the internal combustion engine, and the fan to expel cool air.

4 Claims, 7 Drawing Sheets

PORTABLE INTERNAL COMBUSTION ENGINE WITH HEATING AND COOLING CAPABILITIES

BACKGROUND

1. Field of the Invention

The present invention relates generally to portable heating and cooling systems, and more specifically, to a portable internal combustion engine system for heating and cooling small spaces, such as during camping and the like.

2. Description of Related Art

Portable heating and cooling systems are well known in the art and are effective means to add heat and/or cool air to a small area. Some systems include small electric heaters that require electricity to function. Similarly, fans and/or cooling apparatus typically also require electricity to properly function. In some situations, a user may desire a heating and/or cooling apparatus that is effective yet does not require electricity. One common scenario is during outdoor activities, such as camping, wherein electricity is unavailable. Further, in situations wherein a user's house loses power, there lies a need for an effective, portable heating and cooling apparatus that functions without electricity.

Accordingly, although great strides have been made in the area of portable heating and cooling systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
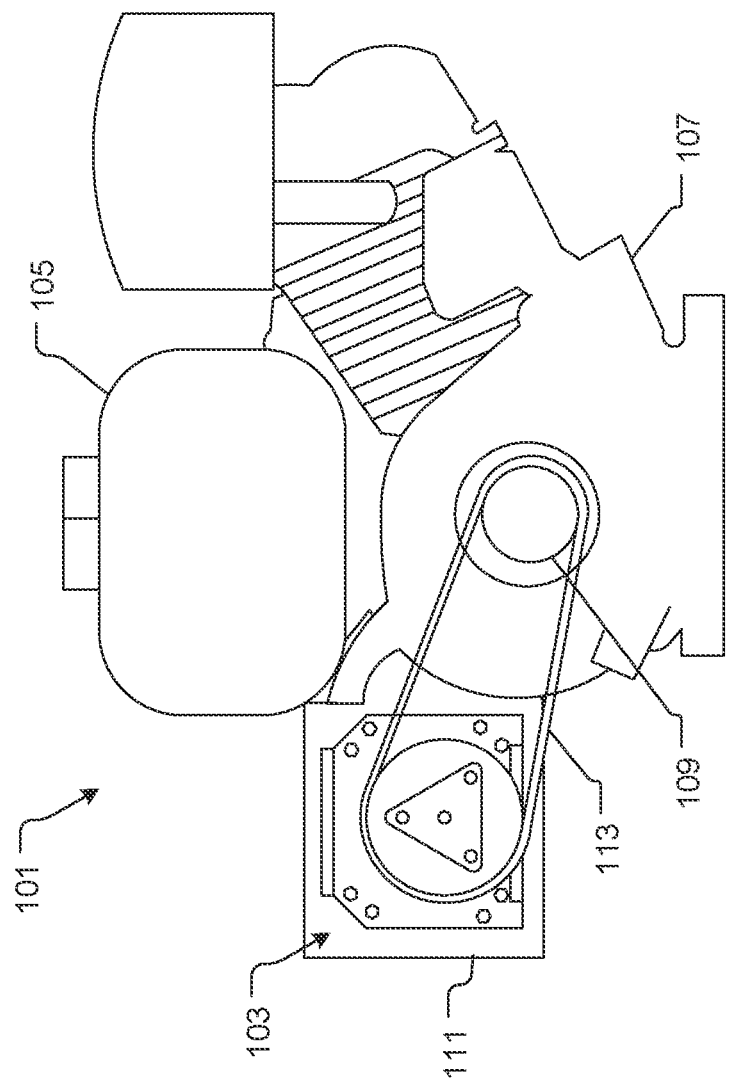
FIG. 1 is a front view of a portable internal combustion engine with a compressor attached thereto in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional heating and/or cooling systems. Specifically, the present invention provides for a portable internal combustion engine having a compressor and configured to provide for portable heating and cooling through use of power generated by the internal combustion engine. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
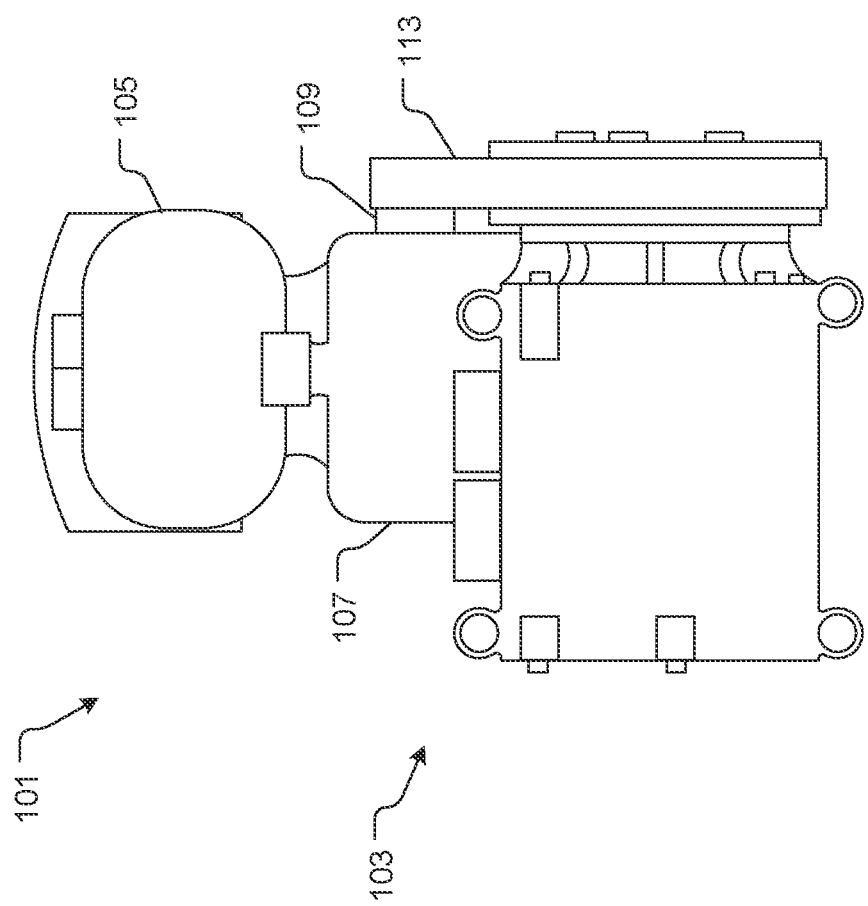
FIG. 2 side view of the portable internal combustion engine with a compressor of FIG. 1.

Referring now to the drawings wherein like reference characters identify corresponding or similar elements throughout the several views, FIGS. 1 and 2 depict front and side views of a portable internal combustion engine 101 with a compressor 103 attached thereto for use with a portable internal combustion engine system 301 of the present invention in accordance with a preferred embodiment of the present application. It will be appreciated that system 301 overcomes one or more of the above-listed problems commonly associated with conventional heating and cooling systems.

In the contemplated embodiment, system 301 includes an internal combustion engine 101 having all the necessary components, as are known in the art, to function as an internal combustion engine. The system includes a fuel storage container 105 connected to the engine housing 107, wherein an output shaft 109 extends therefrom. The internal combustion engine works to provide force to the output shaft 109 to be transferred to one or more other components.

In the preferred embodiment, an air conditioning compressor 103 is engaged with output shaft 109. It should be appreciated that the AC compressor 103 can be secured within a housing 111, which is further secured to the engine 101 by any means, such as bolts or the like. It should be appreciated that any form of housing or engagement of the AC compressor with the engine is contemplated herein.

The compressor 103 receives power from shaft 109 via one or more belts 113. Again, it should be appreciated that the AC compressor 103 includes any known elements in the art to provide functionality as needed. Specifically, the AC compressor 103 is in fluid and/or gaseous communication with condenser coils and evaporative coils, wherein fluid (refrigerant) is pushed through the coils as known in the art. Further, the AC compressor can include an expansion valve to regulate the fluid flow.

Figure 3:
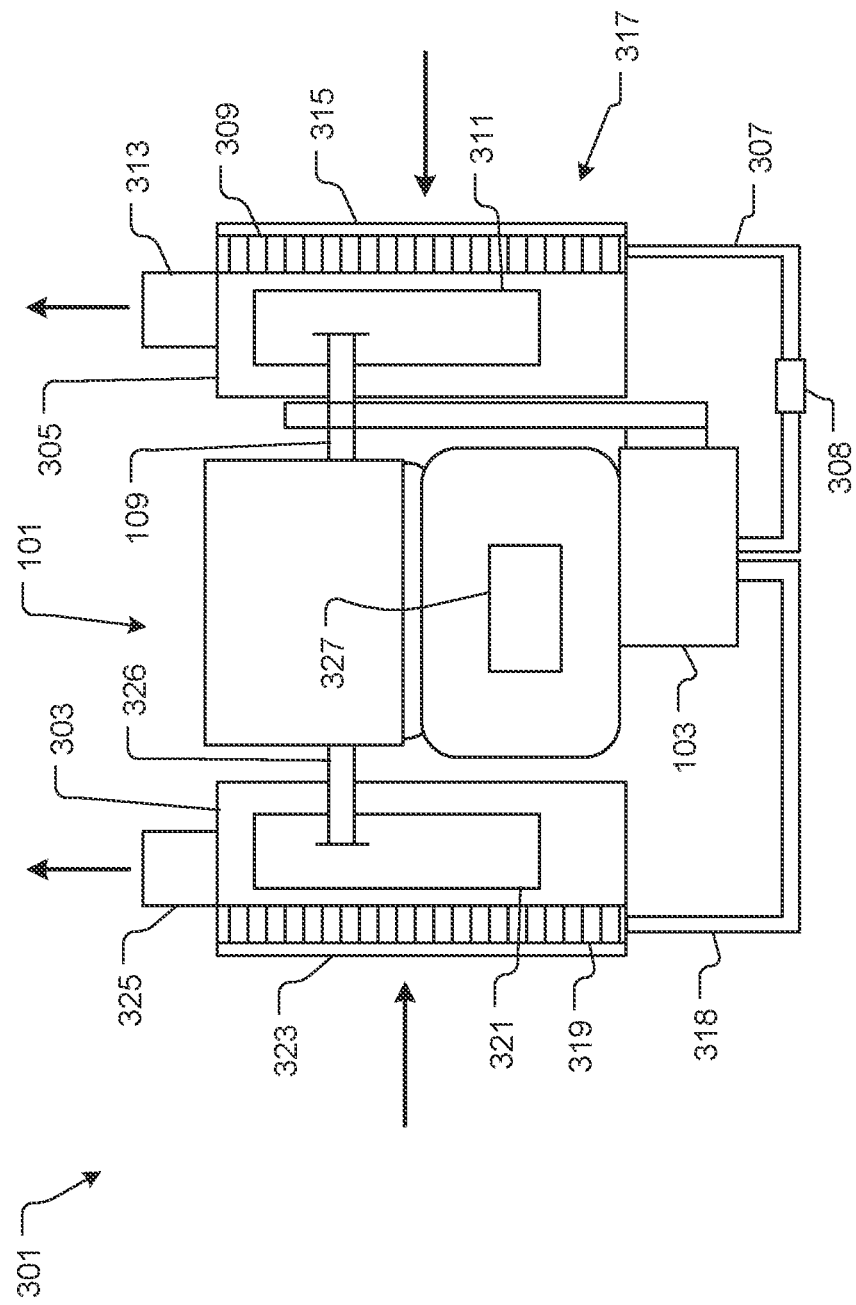
FIG. 3 is a top view of a diagram of a portable internal combustion engine system with heating and cooling capabilities in accordance with a preferred embodiment of the present application.

In FIG. 3, a diagram depicts system 301, wherein system 301 includes the engine 101 and compressor 103. Further included is a heating housing 303 and a cooling housing 305.

In the preferred embodiment, compressor 103 is in fluid communication 307 with evaporative coils 309 housed within cooling housing 305, wherein a fluid passes through an expansion valve 308 before entering the coils 309, thereby resulting in cold coils used to cool air. A first blower 311, such as a squirrel cage blower, is positioned within housing 305 to pull air over the evaporative coils and then push the cooled air out of an outlet 313. The first blower 311 can be in communication with output shaft 109. In the preferred embodiment, the outlet 313 is a round outlet for flex duct connection, however, alternative embodiments could be used. It is further contemplated that an air filter 315 can be positioned within an opening 317 to filter air pulled in to housing 305 via blower 311.

In the preferred embodiment, compressor 103 is further in fluid communication 318 with condenser coils 319 housed within heating housing 303, wherein heated fluid is passed therethrough. A second blower 321 is positioned within housing 303 and provides a means to pull air over the condenser coils 319, through a filter 323, and push the heated air out of an outlet 325, such as a round outlet for flex duct connection. The blower 321 can be engaged with a second output shaft 326.

It should be appreciated that the foregoing configuration is described by way of example, and that alternative embodiments could be developed with similar functionality.

It should be appreciated that one of the unique features believed characteristic of the present application is the incorporation of a heating and cooling system into an internal combustion engine.

Figure 4:
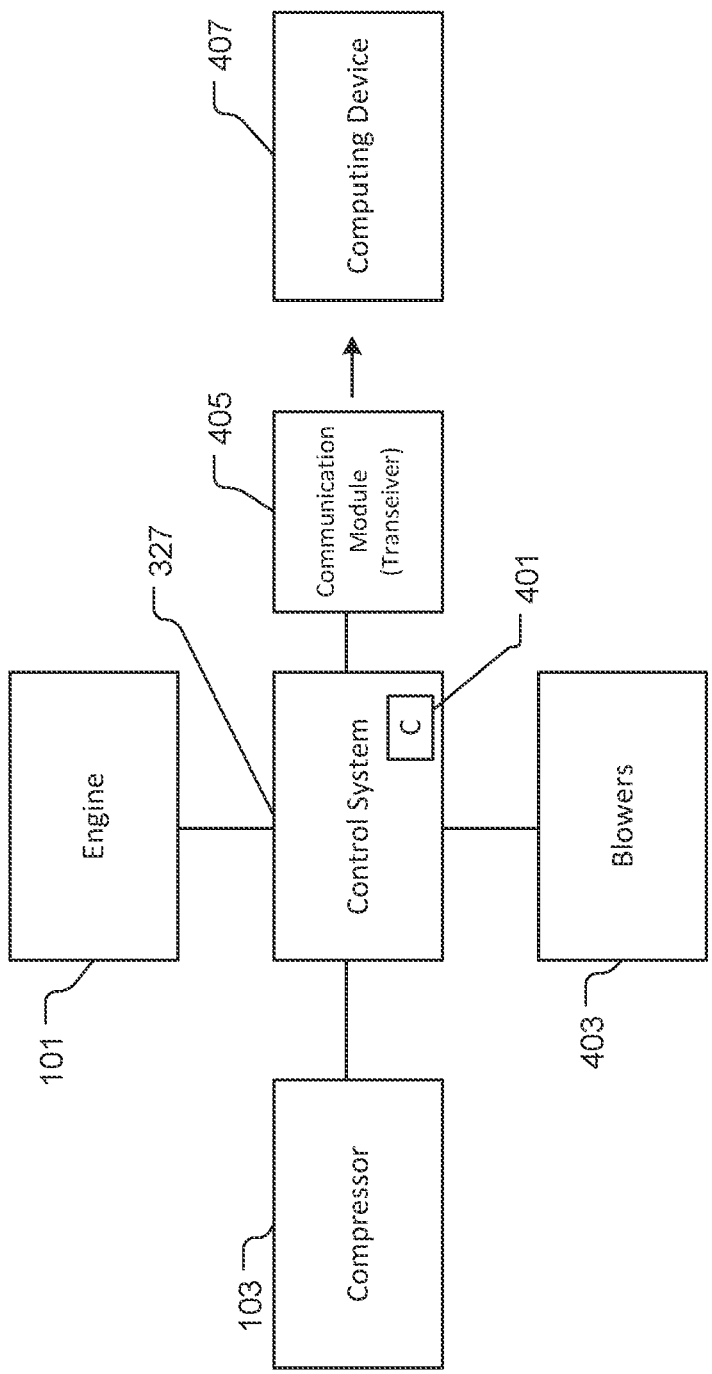
FIG. 4 is a simplified schematic of a control system of FIG. 3.

It is contemplated that a control system 327 can be implemented, wherein the control system 327 provides for user control of the system. The control system can merely include one or more buttons/switches or the like that provides for user control between heating and cooling, and further user control of other options, such as blower speed and the like. However, in other embodiments, as shown in FIG. 4, the control system 327 can include a computing device 401, wherein the computing device 401 can be in wired or wireless communication with additional computing elements associated with the various other components. As shown, the control system 327 with computing device 401 can be in communication with the engine 101, the compressor 103, and the first and second blowers 403. In addition, the control system 327 can include a wireless communication module 405 that provides for wireless communication with a user computing device 407, such as a mobile computer, smart phone, tablet, or the like, thereby allowing for remote control and monitoring of the system 301.

Figure 5:
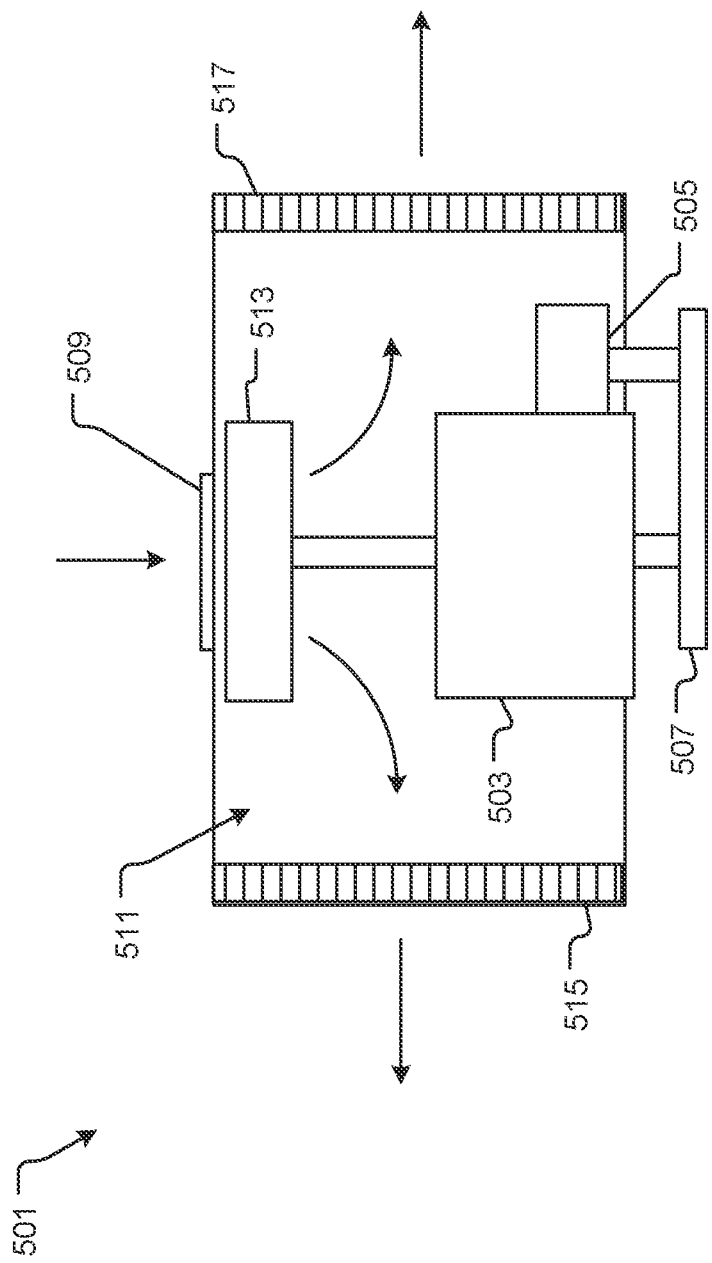
FIG. 5 is a top schematic view of a portable internal combustion engine with a compressor attached thereto in accordance with an alternative embodiment of the present application.

In FIG. 5, an alternative embodiment of a system 501 is shown. System 501 includes an engine 503 with an AC compressor 505 and belt 507 as discussed above. In this embodiment, an air inlet 509 leads into an interior chamber 511, wherein one fan 513 pushes the air through both condenser coils 515 and evaporator coils 517. System 501 may include any of the features discussed above.

Figure 6:
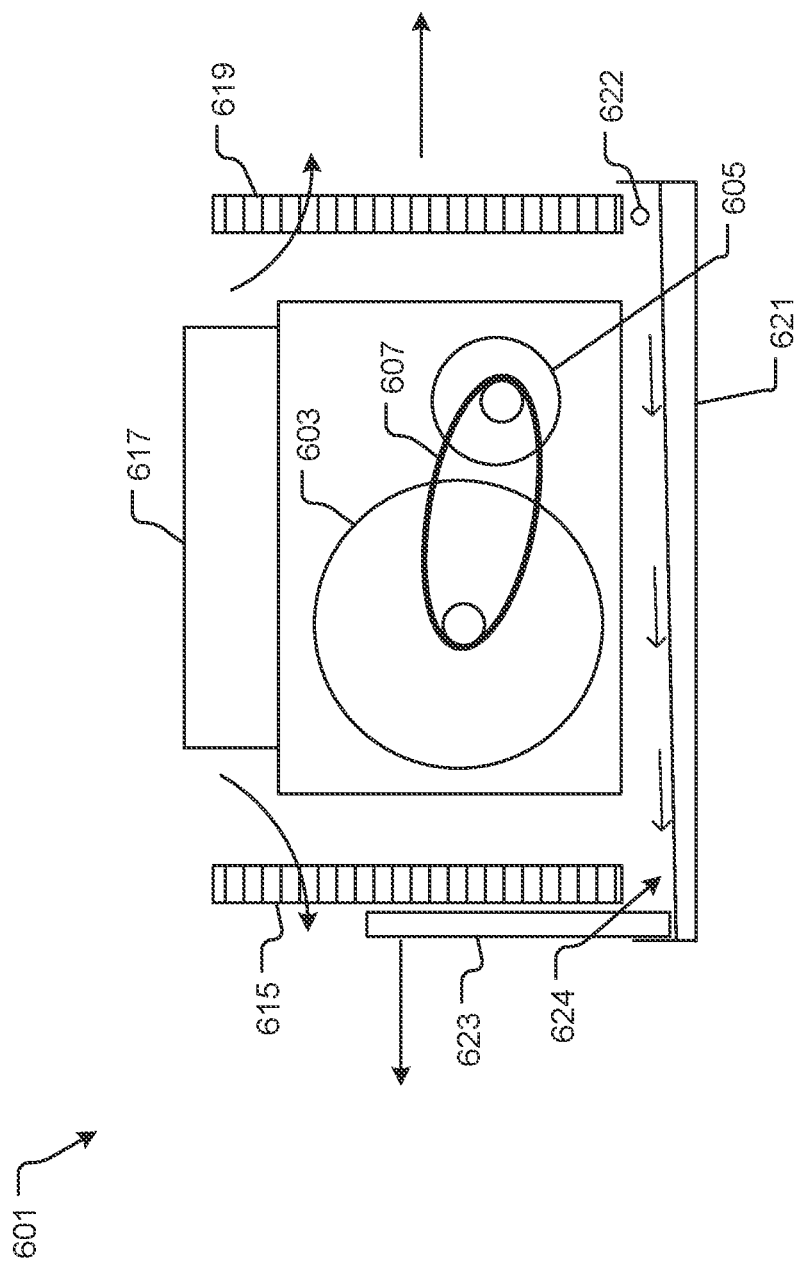
FIG. 6 is a side schematic view of a portable internal combustion engine with a compressor attached thereto in accordance with an alternative embodiment of the present application.

In FIG. 6, another alternative embodiment of a system 601 is shown. System 601 includes an engine 603 with an AC compressor 605 and a belt 607. In this embodiment, a fan 617 is operated via the engine 603 to pull air into the system, wherein the air is expelled through both condenser coils 615 and evaporator coils 619. As shown, a base plate 621 is provided to rest below the coils 615, 619, wherein the plate collects condensation 622 and channels the condensation to a sponge 623 via a tapered top surface 624, wherein the condensation is absorbed through capillary action such that warm air then passes over the sponge. System 601 may include any of the features discussed above.

Figure 7:
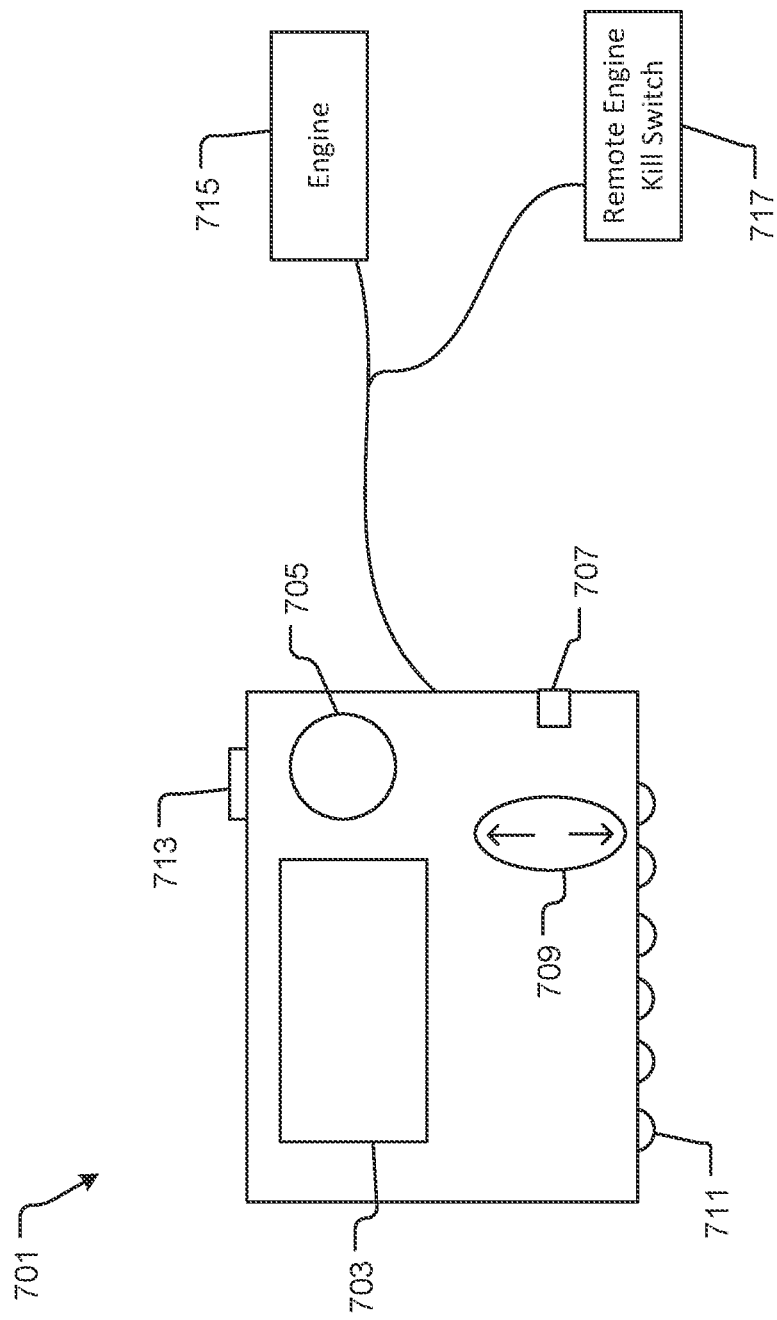
FIG. 7 is a schematic of a control system for use with the system of the present invention.

In FIG. 7, a schematic depicts a control system 701 that may be utilized with any of the systems discussed above. As shown, control system 701 may include a display 703, one or more speakers 705, one or more ports 707 such as for charging accessories, a temperature selection 709, and one or more lights 711. Further, the control system 701 may incorporate a carbon monoxide detector 713 for improved safety. The control system 701 may be in wired communication with the engine 715 as well as with a remote engine kill switch 717.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A portable internal combustion engine system, comprising:
    an internal combustion engine having a first output shaft, wherein the internal combustion engine rotates the first output shaft;
    a compressor rotatably engaged with the first output shaft via a belt, the first output shaft is configured to provide energy thereto;
    a fan coupled to the internal combustion engine and configured to pull air into a housing, the housing forming an internal chamber;
    an evaporative coil in gaseous communication with the housing and configured to receive air from the fan that passes through the internal chamber;
    a condenser coil in gaseous communication with the housing and configured to receive air from the fan that passes through the internal chamber; and a control system configured to operate the compressor, the internal combustion engine, and the fan to expel cool air;

wherein air enters the internal chamber via an air inlet and exits the housing via both the condenser coil and the evaporator.

2. The system of claim 1, further comprising:

a base plate positioned below the evaporative coil and the condenser coil, the base plate having a tapered top surface to receive condensation from the condenser coil.

3. The system of claim 1, wherein the control system further comprises:

a carbon monoxide detector;

one or more ports;

one or more lights;

a display; and a temperature controller.

4. The system of claim 3, wherein the control system is in wired communication with the internal combustion engine and with a remote engine kill switch.

\* \* \* \* \*